United States Patent Office 3,439,802
Patented Apr. 22, 1969

3,439,802
CLAY TREATMENT
Miller B. Mallary, Macon, Ga., assignors, by mesne assignments, to Engelhard Minerals & Chemicals Corporation, Edison, N.J., a corporation of Delaware
No Drawing. Filed Dec. 14, 1966, Ser. No. 601,560
Int. Cl. B03d 1/00
U.S. Cl. 209—5
7 Claims

ABSTRACT OF THE DISCLOSURE

Stockpiled (aged) gray kaolin clay crudes are pulped and small amounts of barium carbonate or barium hydroxide are added. The treated pulps are dispersed with sodium carbonate and sodium silicate, and conditioned for the selective froth flotation of colored titania impurities. The purified clay is then bleached chemically. The pretreatment with barium compounds overcomes difficulties encountered in floating impurities from this type of clay.

Background of the invention

Gray kaolin clay (sometimes referred to as "hard" clay) is a unique type of sedimentary kaolin clay that is found in extensive deposits in Georgia. This type of clay is quite different in some respects from the so-called "white" kaolins which are widely mined and wet-processed to produce paper coating clays. One distinguishing characteristic of the raw gray clay is that it has an unusual distinctly gray color cast. In contrast, the "white" kaolins, even the 90-plus brightness pigment obtained by flotation beneficiation and bleaching, have a distinct yellow or orange color cast. Another distinguishing characteristic of the gray clays is the extremely fine natural particle size of the clay. By conventional chemical and crystallographic analytical techniques, however, the gray and white clays are deceptively similar.

Gray clay can be subjected to flotation beneficiation and an oxidation-reduction treatment, as described in U.S. 3,353,668 to James B. Duke, to produce a remarkably high brightness (90-plus G.E. brightness) clay pigment. The beneficiated clay has a blue-white color cast which is highly desirable for pigment purposes.

An unusual problem is encountered during the wet-processing of gray kaolin to obtain the blue-white, finely divided clay pigment. Once the hard clay has been mined and aged in conventional storage facilities, the aged hard crude begins to respond poorly to flotation. This deterioration of the clay is surprising since the clay crudes are at least 50 million years old and the effect of periods of time of the order of a month or two would be expected to be immeasurable or insignificant. Especially surprising is the fact that the deterioration becomes progressively worse with time. By way of example, a gray crude which originally provides 91 to 92 percent brightness beneficiated clay pigments may result in pigments of only 87 to 89 percent brightness if the crudes are stored for a month or two before being beneficiated. While this loss of brightness may appear minimal, the loss of as much as 1 percent brightness in a clay pigment can represent a very serious loss in the economic value of the clay pigment. This is especially true when the brightness of the clay pigment value falls below the 90 percent level.

It is of interest to note that a similar problem is not encountered in processing white kaolins by flotation.

Summary of the invention

An object of the present invention is to process gray kaolin clay in a manner such as to overcome the poor flotation characteristics of the aged mined crude.

Another object is the provision of a method for brightening aged hard kaolin crudes to exceptionally high brightness levels.

The present invention results from my hypothesis that the poor flotation characteristics of aged hard (gray) kaolin crudes results from the oxidation of small quantities of sulfur-containing impurities (probably sulfides) in the crude after the crude is mined, and the resulting hypothesis that the oxidation products, especially sulfates, impair the dispersion properties of the crudes. Since adequate dispersion of the clay is a prerequisite to the desired selective flotation of the colored impurities, it has been concluded that the impairment of the dispersion system results in the impairment of the subsequent flotation.

Briefly stated, in accordance with the present invention, a pulp of aged gray kaolin crude is pretreated to avoid the deleterious effect of the aging on the flotation characteristics of the crude by addition of a source of barium ions and a source of hydroxyl ions (e.g., barium hydroxide or barium carbonate which furnishes hydroxyl ions by hydrolysis). The treated pulp is then dispersed, subjected to froth flotation in the presence of flotation reagents selective to the flotation of colored impurities (especially titaniferus impurities), and the clay (which reports in the flotation tailings) is bleached chemically, preferably by the oxidation-reduction treatment described in U.S. 3,353,668 (supra).

Description of the invention

In putting my invention into practice, the raw clay is ground and blunged in water at any concentration suitable for handling purposes. The use of 20 to 30 percent solids is suggested although the invention is not limited thereto. The barium carbonate or barium hydroxide can be added to the water in which the clay is blunged or the barium compound can be added to a previously formed aqueous pulp of the clay. As an alternative, the basic barium compound can be formed in situ by incorporating a source of hydroxyl ions, e.g., sodium hydroxide or sodium carbonate, with a source of barium ions, e.g., barium chloride, barium nitrate or barium acetate.

Incorporation of the basic compound into the slurry of aged crude results in a perceptible increase in the pH of the crude. The barium compound introduces barium ions into the pulp and precipitates sulfate ions. In addition, the barium compound neutralizes free acids.

The quantity of barium compound that is added is within the range of 1 to 20 lbs./ton of dry clay, and is usually within the range of 10 to 15 lbs./ton of clay. If desired, the barium compound may be used in combination with other bases, such as sodium hydroxide or ammonium hydroxide. Sufficient basic barium compound (or combination of barium compound with sodium of ammonium hydroxide) should be added to bring the pH to 5.5 or more. The upper limit to the quantity of barium compound is primarily restricted by economic considerations. For practical reasons, addition of barium compound to increase pH above 8.0 is not recommended. The quantity of additive will vary with crudes of different origin, especially with the sulfate content of the aged hard clay.

After treatment with the basic barium compound, the pulp is dispersed, adding more water to the treated pulp if desirable. The dispersant that is used includes a water-soluble alkaline sodium silicate. Preferably, the combination of sodium carbonate and sodium silicate is employed to disperse the clay since the use of the silicate as the sole dispersant in amount sufficient to obtain adequate dispersion may result in undesirable depression of the colored impurities. Recommended is the use of sodium carbonate in amount within the range of 2 to 6 lbs./ton of clay and sodium silicate in amount within the range of 1 to 5 lbs./ton of 38 percent sodium silicate solution or equivalent. The sodium carbonate should be added first, followed by the addition of sodium silicate. A "starvation" quantity of the silicate should be employed to avoid depression of the anatase impurity during flotation.

The dispersed fluid slip can be degritted by screening or sedimentation and fractionated to obtain a fine size paper coating fraction containing, by way of example, at least 90 percent by weight of particles finer than 2.0 microns (as determined by the sedimentation method of particle size analysis).

The dispersed clay can be conditioned for flotation at about 20 percent solids. Preferred reagents for conditioning gray clay for selective flotation of colored impurities are described in U.S. 3,353,668 (supra). Briefly, the preferred froth flotation utilizes auxiliary solid particles ("carrier" particles) such as micron-size calcite, a higher fatty acid, preferably crude or refined tall oil, and oil-soluble petroleum sulfonate, as described in U.S. 2,990,958 to Ernest W. Greene et al. Ground homogeneous plastic, such as micronized polyvinyl chloride, can be used as the auxiliary solid. The froth is cleaned one or more times and the combined flotation tailings (machine discharges) are thickened, bleached by aging with potassium permanganate and then a hydrosulfurous bleaching reagent such as zinc hydrosulfite.

Before describing illustrative examples of the practice of the invention, it should be pointed out that the incorporation of the barium compound with the blunged clay may result in an apparent increase in brightness of the degritted, fractionated feed clay. Since the effectiveness of the flotation step is removing colored impurities can be estimated by subtracting the brightness of the unbleached beneficiated clay from the brightness of the clay charged to the flotation operation, the deceptively high brightness value of the feed clay may lead to an erroneous conclusion that the flotation is not as effective as desired. The effectiveness of the treatment may be confirmed, however, by comparing bleached brightness of products. Since clay products are supplied commercially with bleached brightness specifications, evaluations based upon bleached brightness measurements are of practical significance.

It should also be pointed out that any solid barium carbonate in the flotation pulp would be expected to concentrate with the anatase in the froth concentrate and wound therefore not be present with the beneficiated clay. Similarly, barium sulfate formed by precipitation of barium ions with sulfate ions in the pulp (or added with flotation reagents) would also be expected to report in the froth unless the sulfate were precipitated in situ on the clay and adhered thereto. The presence of the latter phenomena might account for the unusual brightness of the clay product obtained by the practice of the invention since precipitated barium sulfate has outstanding pigmentary properties.

The invention and some of its features and advantages are illustrated by the following examples.

The clay crude employed in the tests was a sedimentary gray crude obtained from a mine near McIntyre, Ga. Geological tests indicated that the crudes had been laid down in the area about 60 million years ago at the end of the Cretaceous period.

Control flotation

In control bench-scale flotation tests with this type of clay, the gray clay crude was blunged in water at about 30 percent solids without a dispersant. The resulting pulp (pH of about 5.5 for fresh crude) was dispersed by adding dry soda ash in amount of 4 lbs./ton clay and "O"® sodium silicate, a commercial aqueous solution of sodium silicate containing 38 percent solids, in amount of 4 lbs./ton of clay ("as is" sodium silicate basis). The dispersed slip was passed through a 325 mesh screen to eliminate coarse grit.

Five hundred grams of the minus 325 slip of McIntyre gray kaolin clay was conditioned for flotation by adding: 150 grams of calcium carbonate classified to a mean particle size of about 5 microns; ammonium sulfate in amount of 6.0 lbs./ton of clay; an aqueous emulsion containing 4.0 lbs. ammonium hydroxide, 6.2 lbs. of distilled refined tall oil containing about 70 percent fatty acids and 25 percent rosin acids, and 6.2 lbs. of a solution of neutral petroleum sulfonate in an equal weight of mineral oil ("Calcium Petronate"®); and 8.0 lbs./ton of lubricating oil (Eureka M). (All reagents reported as lbs./ton of dry clay in the slip.) The pulp, which was at 20.0 percent clay solids, was conditioned for 17 minutes in a Fagergren flotation cell. The pH of the conditioned pulp was 8.45.

The pulp was subjected to froth flotation, removing a froth product for ten minutes. The froth was composed predominantly of the calcium carbonate flotation reagent intimately associated with impurities, especially yellowish titaniferous matter originally present in the gray clay. The pulp remaining in the flotation machine was discharged and the froth was repulped in the flotation machine and floated for ten minutes. This procedure was repeated twice. The machine discharge products which contained the oxidized, flotation beneficiated clay were combined and fractionated by beaker sedimentation to recover an aqueous slip of a fine size fraction clay that was at least 92 percent by weight finer than 2.0 microns, equivalent spherical diameter, as determined by the Casagrande method. Sulfuric acid was added to the slip of fine clay in amount sufficient to reduce the pH to 2.5. The flocced slip was thickened to about 20 percent solids and potassium permanganate was added as a 1 percent aqueous solution in amount to provide 5 lbs. $KMnO_4$/ton clay. The slip was mildly agitated at ambient temperature for about 48 hours, resulting in the formation of a deep brown system. Sulfur dioxide gas was bubbled into the slip, resulting in the decolorization of the reduced brown manganese compound. Zinc hydrosulfite bleaching reagent was added to the flocced clay, and the bleached clay was filtered, washed and dried.

Example I

A lot of the gray clay crude above-described was dry mined and stored in the open for two weeks. Pilot plant flotation work was started two weeks after the clay was mined. The flotation process was modeled after the bench-scale tests above-described. The process worked satisfactorily, producing products with 92-plus bleached brightness. Within a month after mining, difficulty was encountered in dispersing the clay, and a decrease in bleached and unbleached brightness was observed. Although various dispersion procedures and quantities were tried, 90-plus bleached brightness products could not be obtained. Titania ($TiO_2$) analyses of the machine discharge products indicated that the flotation operation was inefficient.

The following tests were carried out with crudes from the same mine after the mined crude had been stockpiled for four months.

One sample of crude was blunged in water as described above, producing a slip having a pH of 3.3. The blunged slip was dispersed by adding dry sodium carbonate in amount of 4 lbs. $Na_2CO_3$/ton dry clay, followed by 4 lbs./ton of "N"® sodium silicate solution. "N"® is generally similar to "O"® sodium silicate solution but contains about 1% less solids. The dispersion, which had a pH of 8.3, was fractionated, and the fine fraction (at least 90 percent minus 2.0 microns) was floated and bleached.

Other samples of the crude were pretreated by blunging the crude in water to which finely divided barium carbonate had been added in amount of 10 lbs. $BaCO_3$/ton of clay. The barium carbonate employed in the tests ("Type FF") had a typical analysis of 99.2 percent $BaCO_3$, contained 0.15 percent reducible sulfur and, by wet screen analysis, was 99.5 percent minus 200 mesh. The pH of the pulp containing the barium carbonate additive was 7.5. The pulp was dispersed by adding sodium carbonate in amount of 4 lbs. $Na_2CO_3$/ton clay and then adding "N"® sodium silicate in amount of 1.5 lbs./ton. This resulted in an excellent dispersion having a pH of 9.1. The dispersion was fractionated, floated and bleached. The procedure was repeated using increasing quantities (2.5 and 3.0 lbs./ton) of sodium silicate in the dispersion step. The pH of these dispersions were 9.1 and 9.1, respectively.

The results of the flotation and the combined flotation-bleaching steps are summarized in table form. These data show that pretreatment of an aged hard crude with barium carbonate could restore the crude to its original dispersibility and responsiveness to flotation. Even using an insufficient quantity of sodium silicate for optimum flotation (1.5 lbs./ton), the clay brightness was improved at least one point by blunging the clay in the barium carbonate suspension.

EFFECT OF BARIUM CARBONATE PRETREATMENT ON THE BRIGHTNESS OF FLOTATION BENEFICIATED STOCKPILE AGED GRAY KAOLIN CLAY

| Pretreatment of aged clay | Clay dispersant, lbs./ton | | Clay brightness, percent | |
|---|---|---|---|---|
| | $Na_2CO_3$ | Na Silicate | Unbleached | Bleached |
| None (clay blunged in water) | 4.0 | 4.0 | 83.9 | 90.1 |
| Clay blunged in $BaCO_3$ suspension | 4.0 | 1.5 | 84.8 | 91.2 |
| Do | 4.0 | 2.5 | 86.2 | 91.5 |
| Do | 4.0 | 3.0 | 86.2 | 92.0 |
| Control (unaged clay) | 4.0 | 4.0 | 86.5 | 91.5 |

Example II

To illustrate the effectiveness of barium hydroxide in minimizing the adverse effect of aging on the flotation beneficiation of gray clay crude, a crude that had aged several weeks in the stockpiles was processed by the bench-scale procedure substantially as described in Example I. The product was a blue-white clay having an excellent brightness of 90.1 percent. In carrying out the process, the blunged crude was dispersed by adding 5 lbs./ton sodium carbonate and 3 lbs./ton "N" brand sodium silicate. The dispersed slip had a pH of 8.0 after degritting and fractionation. The clay had a brightness of 80.5 percent. Using the flotation reagents and procedure above-described, the unbleached beneficiated clay had a brightness of 84.4 percent. Treatment with the potassium permanganate (10 lbs./ton) and zinc hydrosulfite, above-described, increased brightness to 90.1 percent.

After this particular crude had further aged in storage drums, a 30 percent solids pulp had a pH of 3.6. Dispersion required 6.0 lbs./ton sodium carbonate and 3.0 lbs./ton "N" ® sodium silicate. Flotation and bleaching brought the clay to 89.8 percent brightness. In an experimental test, $Ba(OH)_2 \cdot 8H_2O$ was added to the blunged clay in amount of 6.0 lbs./ton before dispersing the pulp with 5.0 lbs./$Na_2CO_3$ and 3.0 lbs./ton "N" brand sodium silicate. The degritted, fractionated pulp had a brightness of 79.5. (In this case, the barium additive did not increase brightness of the crude.) When the bench-scale flotation treatment was applied to this pulp, the beneficiated clay had a brightness of 83.9 percent. After bleaching the flotation beneficiated clay with 10 lbs./ton $KMnO_4$ and zinc hydrosulfite, the clay brightness was 91.1 percent. This value slightly exceeds the brightness of the clay obtained from the freshly mined crude and is more than one point higher than the brightness of clay obtained from the crude that had been aged a shorter time. The example therefore demonstrates the effectiveness of barium hydroxide in improving the response of aged gray clay crude to flotation beneficiation.

I claim:

1. In the treatment of gray kaolin crude that has been aged after mining by a beneficiation process which comprises dispersing the aged crude clay in water in the presence of a dispersant comprising sodium silicate, subjecting the dispersed clay to froth flotation in the presence of an anionic reagent selective to the flotation of colored impurities in the clay, and recovering the flotation tailings which is a clay of increased purity, the improvement which comprises incorporating a source of barium ions and a source of hydroxyl ions into an aqueous pulp of aged crude clay before said pulp is dispersed with said dispersant comprising sodium silicate and subjected to froth flotation, said barium ions and hydroxyl ions being present in amount sufficient to improve the brightness of the clay in said flotation tailings after said clay pulp has been dispersed and subjected to said flotation.

2. The method of claim 1 wherein an aqueous pulp of aged clay would have a pH below 4 in the absence of said source of barium ions and hydroxyl ions, and said source of said ions is present in amount such that said clay pulp containing barium ions and hydroxyl ions has a pH within the range of 5.0 to 8.0.

3. The method of claim 1 wherein barium hydroxide is said source of said barium ions and said hydroxyl ions.

4. The method of claim 1 wherein barium carbonate is said source of said barium ions and said hydroxyl ions.

5. The method of claim 3 wherein said barium hydroxide is employed in amount within the range of 5 to 20 lbs./ton of clay.

6. The method of claim 4 wherein said barium carbonate is employed in amount within the range of 5 to 20 lbs./ton of clay.

7. The method of claim 1 wherein said pulp is dispersed by adding sodium carbonate and thereafter adding sodium silicate.

References Cited

UNITED STATES PATENTS

| 3,337,048 | 8/1967 | Mercade | 209—166 X |
| 3,353,668 | 11/1967 | Duke | 209—166 X |

FOREIGN PATENTS

| 199,795 | 6/1923 | Great Britain. |
| 200,533 | 7/1923 | Great Britain. |

HARRY B. THORNTON, *Primary Examiner.*

ROBERT HALPER, *Assistant Examiner.*

U.S. Cl. X.R.

209—166

U.S. DEPARTMENT OF COMMERCE

PATENT OFFICE

Washington, D.C. 20231

UNITED STATES PATENT OFFICE

CERTIFICATE OF CORRECTION

Patent No. 3,439,802                                                  April 22, 1969

Miller B. Mallary

It is certified that error appears in the above identified patent and that said Letters Patent are hereby corrected as shown below:

In the heading to the printed specification, line 3, "assignors" should read -- assignor --. Column 2, line 43, "Incorporation of the basic compound into the slurry of" should read -- Incorporation of the basic barium compound into the slurry of --. Column 3, line 45, "and wound" should read -- and would --.

Signed and sealed this 14th day of April 1970.

(SEAL)
Attest:

Edward M. Fletcher, Jr.                                     WILLIAM E. SCHUYLER, JR.

Attesting Officer                                                    Commissioner of Patents